(12) United States Patent
Van De Ven et al.

(10) Patent No.: US 9,311,250 B2
(45) Date of Patent: Apr. 12, 2016

(54) TECHNIQUES FOR MEMORY DE-DUPLICATION IN A VIRTUAL SYSTEM

(75) Inventors: Adriaan Van De Ven, Portland, OR (US); Keith Packard, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 263 days.

(21) Appl. No.: 13/330,398

(22) Filed: Dec. 19, 2011

(65) Prior Publication Data

US 2013/0159596 A1  Jun. 20, 2013

(51) Int. Cl.
*G06F 12/00* (2006.01)
*G06F 12/10* (2006.01)

(52) U.S. Cl.
CPC ........ *G06F 12/109* (2013.01); *G06F 2212/152* (2013.01); *Y02B 60/1225* (2013.01)

(58) Field of Classification Search
CPC ..... G06F 3/0617; G06F 3/067; G06F 3/0683; G06F 9/455; G06F 9/45533; G06F 12/00; G06F 17/30194; G06F 11/1484; G06F 17/30
See application file for complete search history.

(56) References Cited

U.S. PATENT DOCUMENTS

| | | | |
|---|---|---|---|
| 8,374,242 B1 * | 2/2013 | Lewis et al. ............... | 375/240.12 |
| 8,463,980 B2 * | 6/2013 | Post et al. ........................... | 711/6 |
| 8,463,981 B2 * | 6/2013 | Mori et al. ........................ | 711/6 |
| 2009/0070776 A1 | 3/2009 | Dahlstedt | |
| 2009/0204718 A1 * | 8/2009 | Lawton et al. ................. | 709/230 |
| 2010/0161908 A1 * | 6/2010 | Nation et al. ................. | 711/147 |
| 2011/0138147 A1 | 6/2011 | Knowles et al. | |
| 2012/0131259 A1 * | 5/2012 | Baskakov et al. .................. | 711/6 |
| 2012/0137045 A1 | 5/2012 | Bacher et al. | |
| 2012/0159098 A1 * | 6/2012 | Cheung et al. ................ | 711/162 |
| 2012/0173822 A1 * | 7/2012 | Testardi et al. ............... | 711/135 |
| 2012/0254497 A1 * | 10/2012 | Ni et al. ............................ | 711/6 |

OTHER PUBLICATIONS

Pan, "Hypervisor support for Efficient Memory De-duplication", Parallel and Distributed systems (ICPADS), 2011 IEEE 14 th—Dec. 7-9, 2011 ISBN 978-1-4577-1875-5.*
Patent Examination Report No. 1 received for Australian Patent Application No. 2012208973, mailed Jul. 19, 2013, 3 pages.
Intel 910GML/915G/915GM/915GMS/915GV and 910GL Express Chipsets, Intel Dynamic Video Memory Technology (DVTM) 3.0, Aug. 2005, 24 pages, (Author unknown).

* cited by examiner

*Primary Examiner* — Tuan Thai
*Assistant Examiner* — Mohamed Gebril
(74) *Attorney, Agent, or Firm* — Kacvinsky Daisak Bluni PLLC

(57) ABSTRACT

Techniques for memory de-duplication in a virtual system are described. An apparatus may comprise a first processor circuit coupled to a second processor circuit. A memory unit may be coupled to the first processor circuit and the second processor circuit, the memory unit to store private memory pages and shared memory pages for multiple virtual machines. A memory management application may be operative on the first processor circuit and the second processor circuit in a shared manner to perform memory de-duplication operations on the private memory pages stored in the memory unit to form shared memory pages. The memory management application may perform sequential memory de-duplication operations on the first processor circuit, and parallel memory de-duplication operations on the second processor circuit. Other embodiments are described and claimed.

19 Claims, 9 Drawing Sheets

600

RETRIEVE A SET OF PRIVATE MEMORY PAGES, EACH PRIVATE MEMORY PAGE STORED IN A CORRESPONDING PRIVATE MEMORY SEGMENT ACCESSIBLE BY A SINGLE VIRTUAL MACHINE
602

EXECUTE, BY A FIRST PROCESSOR CIRCUIT, A SET OF SEQUENTIAL MEMORY DE-DUPLICATION INSTRUCTIONS TO CONVERT THE SET OF PRIVATE MEMORY PAGES INTO A SHARED MEMORY PAGE FOR MULTIPLE VIRTUAL MACHINES
604

EXECUTE, BY A SECOND PROCESSOR CIRCUIT, A SET OF PARALLEL MEMORY DE-DUPLICATION INSTRUCTIONS TO CONVERT THE SET OF PRIVATE MEMORY PAGES INTO THE SHARED MEMORY PAGE FOR THE MULTIPLE VIRTUAL MACHINES
606

STORE THE SHARED MEMORY PAGE IN A SHARED MEMORY SEGMENT ACCESSIBLE BY THE MULTIPLE VIRTUAL MACHINES
608

NOMINATE, BY THE FIRST PROCESSOR CIRCUIT, A SET OF CANDIDATE MEMORY PAGES SUITABLE FOR THE SHARED MEMORY PAGE BASED ON A SET OF SELECTION CRITERIA
702

GENERATE, BY THE SECOND PROCESSOR CIRCUIT, ONE OR MORE PAGE HASH VALUES FOR ONE OR MORE CANDIDATE MEMORY PAGES WITHIN THE SET OF CANDIDATE MEMORY PAGES
704

COMPARE, BY THE SECOND PROCESSOR CIRCUIT, THE PAGE HASH VALUES TO IDENTIFY MATCHING PAGE HASH VALUES REPRESENTING IDENTICAL MEMORY PAGES
706

MERGE, BY THE FIRST PROCESSOR CIRCUIT, THE IDENTICAL MEMORY PAGES INTO THE SHARED MEMORY PAGE
708

NOMINATE, BY THE FIRST PROCESSOR CIRCUIT, A SET OF CANDIDATE MEMORY PAGES SUITABLE FOR THE SHARED MEMORY PAGE BASED ON A SET OF SELECTION CRITERIA
*802*

SORT, BY THE FIRST PROCESSOR CIRCUIT, THE CANDIDATE MEMORY PAGES BASED ON A PAGE SIZE FOR EACH CANDIDATE MEMORY PAGE
*804*

COMPARE, BY THE SECOND PROCESSOR CIRCUIT, THE PAGE SIZES OF ADJACENT CANDIDATE MEMORY PAGES TO IDENTIFY MATCHING PAGE SIZES REPRESENTING IDENTICAL MEMORY PAGES
*808*

MERGE, BY THE FIRST PROCESSOR CIRCUIT, THE IDENTICAL MEMORY PAGES INTO THE SHARED MEMORY PAGE
*808*

*FIG. 8*

TECHNIQUES FOR MEMORY DE-DUPLICATION IN A VIRTUAL SYSTEM

BACKGROUND

A virtual machine (VM) is a software implementation of a machine (e.g., a computer) that executes programs like a physical machine. Virtual machines are separated into two major categories, based on their use and degree of correspondence to any real machine. A system virtual machine provides a complete system platform which supports the execution of a complete operating system (OS). In contrast, a process virtual machine is designed to run a single program, which means that it supports a single process. An essential characteristic of a virtual machine is that the software running inside is limited to the resources and abstractions provided by the virtual machine.

With only a small percentage of a physical machine in use at a given time, virtualization allows a physical machine to be shared to increase its overall utilization. One design factor with virtualization is efficient sharing of hardware resources provided by a physical machine, such as processor, memory and networking bandwidth. Processor and networking resources are typically underutilized even in a virtual environment. However, memory resources are often in high demand. Therefore, memory management techniques directed to efficient memory sharing in a virtual environment potentially enables virtual machines to be more dynamic, power efficient and cost efficient. It is with respect to these and other considerations that the present improvements have been needed.

BRIEF DESCRIPTION OF THE DRAWINGS

FIG. 6 illustrates an embodiment of a first logic flow for a memory management apparatus of a virtual machine.

FIG. 7 illustrates an embodiment of a second logic flow for a memory management apparatus of a virtual machine.

FIG. 8 illustrates an embodiment of a third logic flow for a memory management apparatus of a virtual machine.

DETAILED DESCRIPTION

Figure 1:
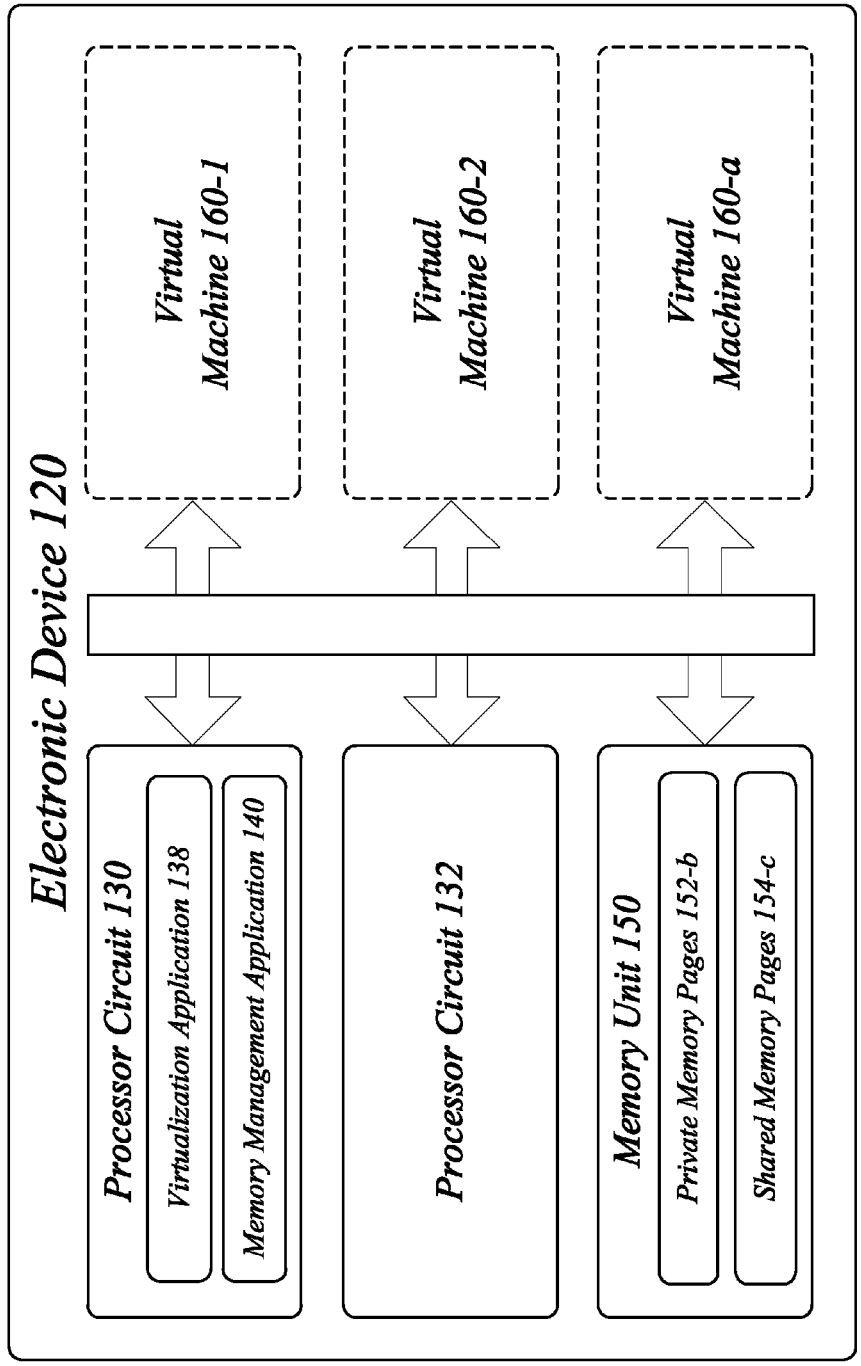
FIG. 1 illustrates an embodiment of a first memory management apparatus of a virtual machine.

Various embodiments are generally directed to virtualized systems. Some embodiments are particularly directed to enhanced memory management techniques for virtualized systems supporting multiple virtual machines.

Typically virtualized systems are inefficient in cases where multiple virtual machines, particularly those executing similar operating systems (OS) and application programs, use memory pages with duplicative content. In an attempt to compensate for this inefficiency, memory management techniques such as memory de-duplication may be used to detect duplicate memory pages and share them among multiple virtual machines. However, conventional memory de-duplication techniques are computationally expensive mathematical operations. Further, conventional memory de-duplication techniques are typically limited to a single processor, or potentially multiple processors of similar design, and are therefore subject to the advantages and disadvantages associated with a given processor architecture.

Embodiments solve these and other problems by implementing enhanced memory management techniques across multiple heterogeneous processor circuits of a physical device used for a virtual system. More particularly, the enhanced memory management techniques are arranged to manage memory pages for multiple virtual machines in a shared manner across multiple heterogeneous processor circuits to exploit specific design advantages provided by a given processor architecture for each processor circuit. Aligning specific memory management operations (or workloads) with specific processor circuits well-suited for the specific memory management operations results in more efficient memory sharing in a virtual environment, and potentially enables virtual machines to be more dynamic, power efficient and cost efficient.

In one embodiment, for example, an apparatus may comprise a first processor circuit coupled to a second processor circuit. A memory unit may be coupled to the first processor circuit and the second processor circuit, the memory unit to store private memory pages and shared memory pages for multiple virtual machines. A memory management application may be operative on the first processor circuit and the second processor circuit in a shared manner to perform memory de-duplication operations on the private memory pages stored in the memory unit to form shared memory pages. The memory management application may perform sequential memory de-duplication operations on the first processor circuit, and parallel memory de-duplication operations on the second processor circuit. In this manner, private memory pages with duplicative content may be transformed into a shared memory page with reduced compute cycles and associated latency and costs. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a memory management apparatus 100. In one embodiment, the memory management apparatus 100 may comprise a computer-implemented apparatus comprising an electronic device 120 having multiple heterogeneous processor circuits 130, 132, and a memory unit 150. The electronic device 120 may further have installed software applications including a virtualization application 138 and a memory management application 140. Although the memory management apparatus 100 shown in FIG. 1 has a limited number of elements in a certain topology, it may be appreciated that the memory management apparatus 100 may include more or less elements in alternate topologies as desired for a given implementation.

In various embodiments, the memory management apparatus 100 may comprise an electronic device 120. Examples of an electronic device 120 may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

In various embodiments, the memory management apparatus 100 may comprise a processor circuit 130. In general, the processor circuit 130 may have a processor architecture suitable for sequential processing operations. In one embodiment, for example, the processor circuit 130 may comprise a general purpose processor circuit used for general purpose computing, such as a central processing (CPU) for a computing platform. A CPU is designed for applications that are latency-sensitive and have implicit instruction-level parallelism. A CPU may have a largely sequential structure, and as such, a CPU is particularly well-suited for sequential computing operations. The processor circuit 130 can be any of various commercially available general purpose processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processor circuit 130. The embodiments are not limited in this context.

In various embodiments, the memory management apparatus 100 may comprise a processor circuit 132. In general, the processor circuit 132 may have a processor architecture suitable for parallel processing operations. In one embodiment, for example, the processor circuit 132 may comprise a special purpose processor circuit used for special purpose computing, such as a graphical processing unit (GPU) or visual processing unit (VPU) for a computing platform. A GPU is a specialized circuit designed to rapidly manipulate and alter memory in such a way so as to accelerate building of images in a frame buffer intended for output to a display. A GPU is designed for applications with throughput-oriented workloads with abundant parallelism. A GPU may have a highly parallel structure, and as such, a GPU is particularly well-suited for parallel computing operations, where processing of large blocks of data is done in parallel. The processing circuit 132 can be any of various commercially available special purpose processors, including without limitation Intel Extreme Graphics, Graphics Media Accelerator (GMA), Platform Controller Hub (PCH), and HD Graphics processors and chipsets, Nvidia® GeForce®, Tegra®, and Tesla® processors; AMD Fusion® processors; S3 Graphics® S3 Chrome® processors; and similar processors. In various embodiments, the processor circuit 132 may be integrated with the processor circuit 130, implemented in a chipset designed for the processor circuit 130, implemented in a graphics card communicatively coupled by a bus to the processor circuit 130, or implemented on a same die as the processor circuit 130. Dual microprocessors, multi-core processors, and other multi-processor architectures may also be employed as the processor circuit 132. The embodiments are not limited in this context.

In various embodiments, the memory management apparatus 100 may comprise a memory unit 150. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. The embodiments are not limited in this context.

In the illustrated embodiment shown in FIG. 1, the processor circuit 130 may be arranged to execute a virtualization application 138 and a memory management application 140. Although the virtualization application 138 and the memory management application 140 are illustrated and described as executed by the processor circuit 130, it may be appreciated that some portions or all of the virtualization application 138 and the memory management application 140 may be executed by other processor circuits implemented by the electronic device 120, such as the processor circuit 132, for example. The embodiments are not limited in this context.

The virtualization application 138 is generally arranged to install and manage multiple virtual machines 160-a on the electronic device 120. In general, a virtual machine 160-a is an abstract computer architecture that can be implemented in hardware or software. Either implementation is intended to be included in the following descriptions of a virtual machine 160-a. In one embodiment, for example, a virtual machine 160-a is a software implementation of a machine that executes programs like a physical machine, such as the electronic device 120. The visualization application 138 may implement a virtual machine 160-a as a system virtual machine that provides a complete system platform capable of supporting execution of a complete operating system (OS) and/or application programs. Additionally or alternatively, the visualization application 138 may implement a virtual machine 160-a as a process virtual machine designed to run a single program, which means that it supports a single process. The virtual machines 160-a may use various hardware resources provided by the electronic device 120, such as the processor circuits 130, 132 and the memory unit 150, among other computing and communications platform components implemented by the electronic device 120. The virtualization application 138 may implement any number of virtualization techniques to create the virtual machines 160-a, including a virtual machine manager (VMM) or a hypervisor, among other virtualization techniques. The embodiments are not limited in this context.

The virtualization application 138 may be implemented using any number of known virtualization software and/or hardware platforms. Examples for the visualization application 138 may include without limitation virtualization applications such as Kernel-based Virtual Machine (KVM)® made by Red Hat®, Inc., Oracle® VM® made by Oracle Corporation, VMware® ESX® made by VMware, Inc., and VxWorks® made be Wind River Systems®, Inc., z/VM® made by International Business Machines® Corporation, and similar virtualization platforms. The embodiments are not limited in this context.

Although various embodiments are described in the context of virtual machines 160-a as created and managed by the virtualization application 138, it may be appreciated that some embodiments may be implemented for any electronic device 120 providing a hardware platform that is segmented into multiple, discrete, computing portions. For instance, various embodiments may be implemented using system partitions that separate a single hardware platform into multiple hardware sub-systems. For instance, a hardware platform having multiple processors and memory units may be partitioned into two hardware sub-systems, each having a processor and a memory unit. The embodiments are not limited in this context.

It is worthy to note that "a" and "b" and "c" and similar designators as used herein are intended to be variables representing any positive integer. Thus, for example, if an implementation sets a value for a=5, then a complete set of virtual machines 160-a may include virtual machines 160-1, 160-2, 160-3, 160-4 and 160-5. The embodiments are not limited in this context.

The memory management application 140 is generally arranged to perform memory management operations for a set of virtual machines 160-a. Each virtual machine 160-a may be allocated a discrete portion of memory from the memory unit 150. Each virtual machine 160-a may then read and write a set of private memory pages 152-b to its allocated portion of memory. A private memory page 152-b is a memory page for which has restricted access. For example, the virtualization application 138 implements security measures to ensure a first virtual machine 160-1 may not access private memory pages 152-b for a second virtual machine 160-2, and vice-versa.

A memory page (sometimes referred to as a virtual page or simply page) is generally a fixed-length contiguous block of virtual memory that is a smallest unit for memory allocation by an operating system for a program and transfer between main memory and an auxiliary store, such as a hard disk drive. Page size is usually determined by processor architecture. Traditionally, pages in a system had uniform size, for example 4096 bytes. However, modern processor designs often allow two or more, sometimes simultaneous, page sizes due to the benefits and penalties. There are several points that can factor into choosing a given page size, including factors such as page size versus page table size, page size versus translation lookaside buffer (TLB) usage, internal fragmentation of pages, page size versus disk access, and so forth.

In one embodiment, the virtual machines 160-a may execute similar operating systems and application programs. When executing the same operating system and application programs, many private memory pages 152-b are identical. When private memory pages 152-b are identical, they can be consolidated into a shared memory page 154-c, thereby releasing memory for use in other applications. A shared memory page 154-c may be accessed by a set of multiple virtual machines 160-a having the identical private memory pages 152-b used to create the shared memory page 154-c. In this sense a shared memory page 154-1 is still private in that the shared memory page 154-1 may not be accessed by other virtual machines 160-a that did not have identical private memory pages 152-b used to create the shared memory page 154-1.

To create shared memory pages 154-c, the memory management application 140 may implement various memory management techniques, such as memory de-duplication. Memory de-duplication may be used to detect identical private memory pages 152-b and share them among multiple virtual machines 160-c. However, conventional memory de-duplication techniques are relatively expensive in terms of compute cycles. Further, conventional memory de-duplication techniques are limited to a single processor, or potentially multiple processors of similar design, and are therefore subject to the advantages and disadvantages associated with a given processor architecture.

The memory management application 140 solves these and other problems by implementing enhanced memory management techniques across the multiple heterogeneous processor circuits 130, 132 of the electronic device 120 used for the virtual machines 160-a. More particularly, the enhanced memory management techniques are arranged to manage private memory pages 152-b for multiple virtual machines 160-c in a shared manner across multiple heterogeneous processor circuits 130, 132 to exploit specific design advantages provided by a given processor architecture for each processor circuit 130, 132.

The memory management application 140 may use the processor circuits 130, 132 in a shared manner to perform memory de-duplication operations on private memory pages 152-b stored in the memory unit 150 to form shared memory pages 154-c. The memory management application 140 may assign heterogeneous workloads to the heterogeneous processor circuits 130, 132. For example, since the processor circuit 130 has a processor architecture that is well-suited to sequential compute operations, the memory management application 140 may perform sequential memory de-duplication operations on the processor circuit 130. Since the processor circuit 132 has a processor architecture that is well-suited to parallel compute operations, the memory management application 140 may perform parallel memory de-duplication operations on the processor circuit 132. In one embodiment, the processor circuits 130, 132 may share a memory cache, such as a last level cache (LLC) or L3 cache, to communicate information between each other in an efficient manner. By applying heterogeneous workloads on the heterogeneous processor circuits 130, 132, the memory management application 140 may realize increased performance and lower costs when implementing memory de-duplication operations.

Figure 2:
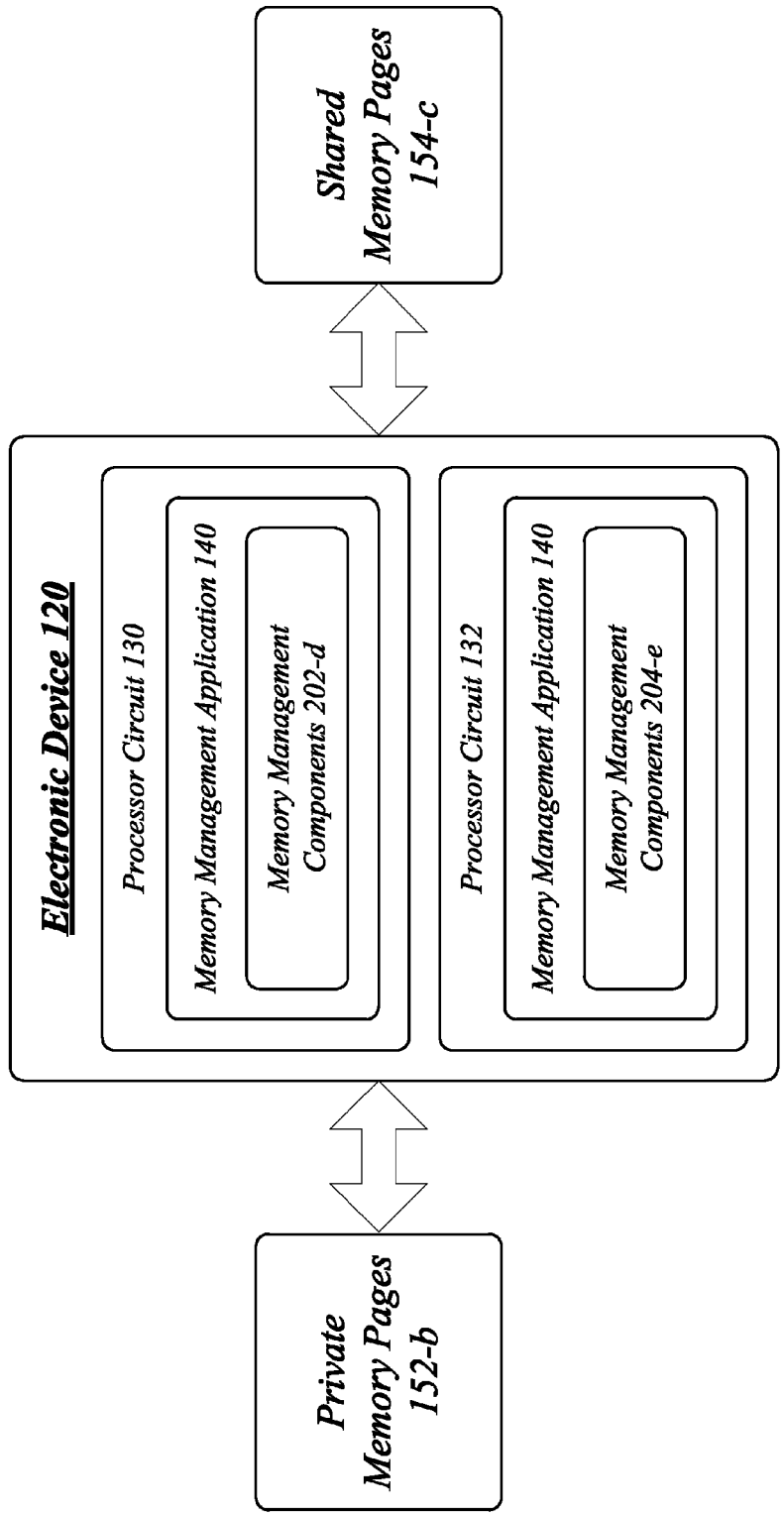
FIG. 2 illustrates an embodiment of a second memory management apparatus of a virtual machine.

FIG. 2 illustrates a block diagram for a memory management apparatus 200. The memory management apparatus 200 may be an exemplary implementation of the memory management apparatus 100. Although the memory management apparatus 200 shown in FIG. 2 has a limited number of elements in a certain topology, it may be appreciated that the memory management apparatus 200 may include more or less elements in alternate topologies as desired for a given implementation.

As previously described, the electronic device 120 may utilize heterogeneous processor circuits 130, 132 each optimized for different types of workloads. For instance, the processor circuit 130 may have a processor architecture suitable for sequential processing operations, such as a CPU for a computing platform. Modern CPUs are ideal for reducing execution time of sequential programs through various architectural techniques to hide memory-latency and extract instruction-level parallelism. Moreover, multiple CPUs along with multi-threading capability per CPU are better suited for coarse-grained task-level parallelism. In contrast, the processor circuit 132 may have a processor architecture suitable for parallel processing operations, such as a GPU for the computing platform. GPUs are throughput-oriented processors primarily designed for massively parallel graphics applications. As such, in their general-purpose and programmable form, GPUs are naturally suited for data-parallel program segments with abundant parallelism.

The memory management apparatus 200 provides a unified execution environment to exploit the full potential of heterogeneous processor circuits 130, 132 implemented as a CPU and a GPU, respectively. In this manner, the memory management application 140 may allocate those memory management operations that are serialized and/or optimized for a CPU, and delegate data-parallel or "massively-parallel" segments of the memory management application 140 to an on-die or off-die GPU.

As shown in FIG. 2, the memory management application 140 may comprise a first set of memory management components 202-d operative to perform sequential memory de-duplication operations on the processor circuit 130 to take advantage of its sequential processing architecture. Examples of sequential memory de-duplication operations may include without limitation search operations, sort operations, merge operations, and similar operations. The embodiments are not limited in this context.

The memory management application 140 may comprise a second set of memory management components 204-e operative to perform parallel memory de-duplication operations on the processor circuit 132 to take advantage of its parallel processing architecture. Examples of parallel memory de-duplication operations may include without limitation compare operations, compute operations for hash values, compute operations for page size values, and similar operations. The embodiments are not limited in this context.

The memory management application 140 may provide coordination and control support for the memory management components 202-d, 204-e when executing on the respective processor circuits 130, 132. In one embodiment, the memory management components 202-d, 204-e may be implemented as background processing threads or daemons that periodically perform scans of private memory pages 152-b to identify duplicate (or identical) memory pages, and merge duplicate memory pages to form a shared memory page 154-c. In one embodiment, a shared memory page 154-c may be subsequently marked as a read-only file. In one embodiment, merge operations may be performed using a copy-on-write (CoW) technique. The memory de-duplication process releases memory resources from the memory unit 150 for use by other applications. When a virtual machine 160-a changes a shared memory page 154-c for any reason, then the memory management application 140 may provide a new private memory page 152-b for the virtual machine 160-a making the change.

Figure 3:
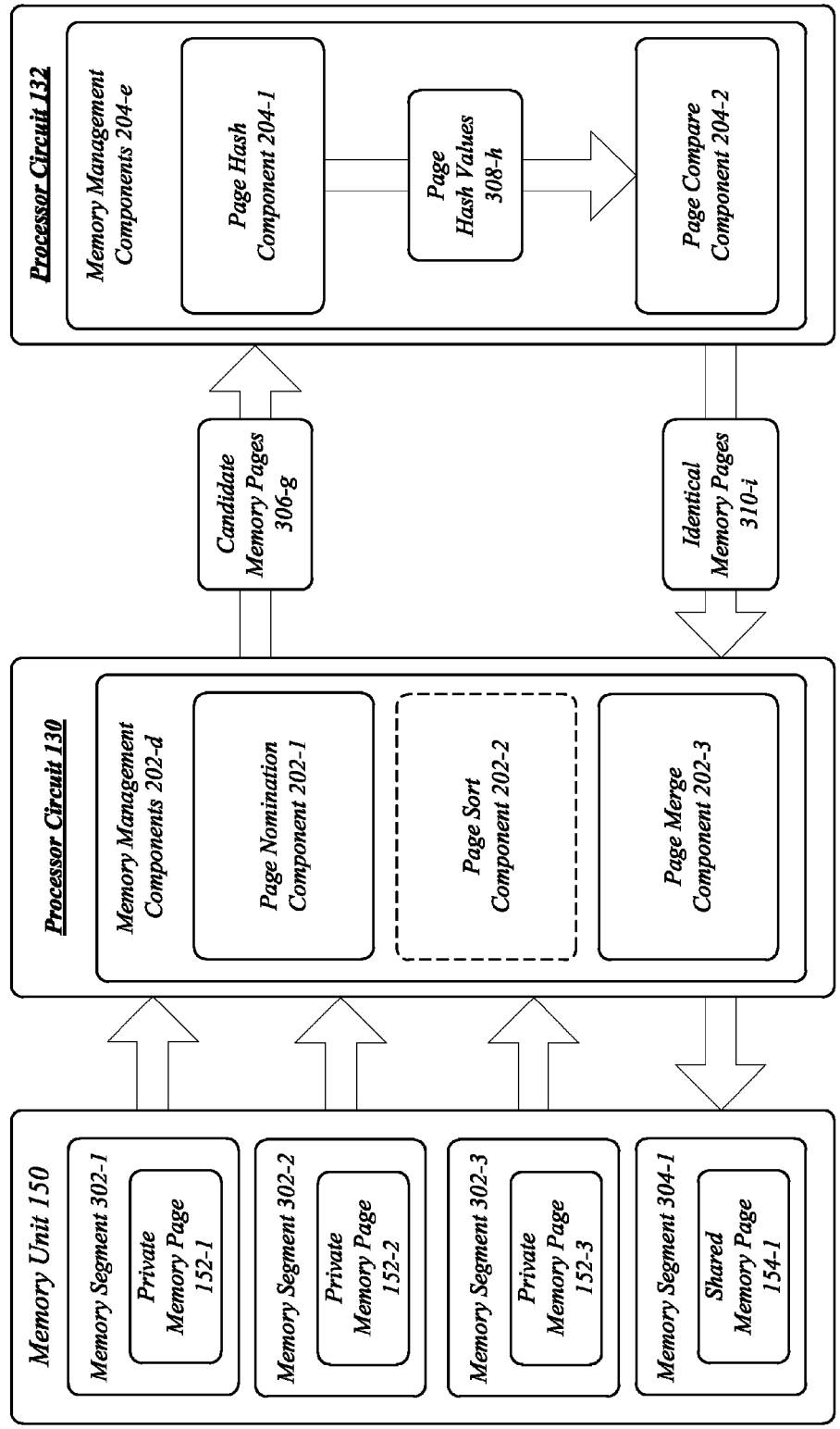
FIG. 3 illustrates an embodiment of a first operating environment for a memory management apparatus of a virtual machine.

FIG. 3 illustrates an embodiment of an operating environment 300 for the memory management apparatus 100 and/or the memory management apparatus 200. The operating environment 300 illustrates an exemplary implementation of the memory management components 202-d, 204-e of the memory management application 140 as executed by the processor circuits 130, 132, respectively. More particularly, the operating environment 300 may illustrate a case where memory de-duplication operations utilize a hashing technique to identify and merge duplicative private memory pages 152-b into a shared memory page 154-c.

As shown in FIG. 3, the memory unit 150 may be segmented into multiple segments or partitions, such as private memory segments 302-x and shared memory segments 304-y. A private memory segment 302-x may be allocated to a single virtual machine 160-a, and is only accessible by that single virtual machine 160-a. A shared memory segment 304-y may be allocated to multiple virtual machines 160-a having identical private memory pages 152-b that have been merged into a shared memory page 154-c, and is only accessible by those virtual machines 160-a with the identical private memory pages 152-b. For instance, assume three virtual machines 160-1, 160-2 and 160-3 are each allocated private memory segments 302-1, 302-2 and 302-3, respectively, from the memory unit 150. Further assume three virtual machines 160-1, 160-2 and 160-3 store private memory pages 152-1, 152-2 and 152-3, respectively, where the stored private memory pages 152-1, 152-2 are determined to be identical and subsequently merged into a shared memory page 154-1. The shared memory page 154-1 may be stored in the shared memory segment 304-1, where it may be accessed by the virtual machines 160-1, 160-2 that stored the private memory pages 152-1, 152-2.

The processor circuit 130 may execute various memory management components 202-d of the memory management application 140, such as a page nomination component 202-1.

The page nomination component 202-1 may be generally arranged to nominate a set of candidate memory pages 306-g suitable for a shared memory page 154-1 based on a set of selection criteria. The page nomination component 202-1 may scan the memory unit 150 across multiple memory segments 302-f for private memory pages 152-b. Scanning operations are sequential in nature, and therefore suitable for execution by the processor circuit 130. Each memory segment 302-f may be allocated to a corresponding virtual machine 160-a. For instance, the page nomination component 202-1 may scan the allocated private memory segments 302-1, 302-2 and 302-3 of the memory unit 150 to determine whether two or more of the private memory pages 152-1, 152-2 and 152-3, respectively, provide some indication of duplicative content.

The page nomination component 202-1 may search for indicators of duplicative content using a set of selection criteria. The selection criteria may initially comprise one or more assumptions about the virtualized system. Examples of selection criteria may comprise without limitation a memory address used by an OS for system files, a memory address used by an application program for application files, a particular page size for a private memory page 152-b, a particular file name for a private memory page 152-b, a particular hash value 308-h, a particular set of private memory segments 304-x with a high-level of duplicative content, a particular set of private memory segments 304-x with a high-level of duplicative content at a given time (e.g., such as auto-updates to an OS at the same time every day), and so forth. It may be appreciated that any number and type of selection criteria may be used for a given implementation, and the embodiments are not limited in this context.

As an example of selection criteria, assume the virtual machines 160-1, 160-2 and 160-3 implement the same operating system (OS). In this case, a first selection criterion may be an assumption that the OS stores a system file at an identical memory address within each private memory segment 302-1, 302-2 and 302-3. When the private memory pages 152-1, 152-2 and 152-3 are stored using the same memory address, the page nomination component 202-1 may nominate the private memory pages 152-1, 152-2 and 152-3 as candidate memory pages 306-1, 306-2 and 306-3. In another example, assume the virtual machines 160-1, 160-2 and 160-3 implement the same application program, such as a word processing application program. In this case, a second selection criterion may be an assumption that the word processing application program stores an identical template file at an identical memory address within each private memory segment 302-1, 302-2 and 302-3. When the private memory pages 152-1, 152-2 and 152-3 are stored using the same memory address, the page nomination component 202-1 may nominate the private memory pages 152-1, 152-2 and 152-3 as candidate memory pages 306-1, 306-2 and 306-3. It may be appreciated these are merely some examples of selection criteria, and others exist as well. The embodiments are not limited in this context.

Once the page nomination component 202-1 nominates a set of candidate memory pages 306-g, such as the candidate memory pages 306-1, 306-2 and 306-3, the page nomination component 202-1 may output the candidate memory pages 306-1, 306-2 and 306-3 to the processor circuit 132. This may be accomplished, for example, using a LLC memory cache, such as a L3 memory cache, shared between the processor circuits 130, 132. Alternatively, this may be accomplished using a system interconnect, such as a Peripheral Component Interconnect (PCI) Express (PCIe) bus, connecting the processor circuits 130, 132.

The processor circuit 132 may execute various memory management components 204-e of the memory management application 140, including a page hash component 204-1. The page hash component 204-1 may be generally arranged to generate one or more page hash values 308-h for one or more candidate memory pages 306-g within the set of candidate memory pages 306-g, such as page hash values 308-1, 308-2 and 308-3 for the candidate memory pages 306-1, 306-2 and 306-3, respectively. The page has component 204-1 may calculate hash values for a set of candidate memory pages 306-g. Hashing operations are parallel in nature, and therefore suitable for execution by the processor circuit 132. For instance, the processor circuit 132 is designed for massive parallel processing operations for similar types of computer program instructions. As such, the processor circuit 132 may calculate hash values for the candidate memory pages 306-1, 306-2 and 306-3 in a highly parallelized manner since computing a hash value for each candidate memory page 306-1, 306-2 and 306-3 is an independent operation, and not dependent on output from any other computation performed on any other candidate memory page 306-1, 306-2 and 306-3. Although this example utilizes only three candidate memory pages 306-1, 306-2 and 306-3 for clarity, it may be appreciated that a given implementation may include a very large number of candidate memory pages 306-g, such as in the thousands or millions of candidate memory pages 306-g depending on processing and memory resources provided by the electronic device 120.

The page hash component 204-1 may generate page hash values 308-h for one or more candidate memory pages 306-g using a hash function. A hash function is any algorithm or subroutine that maps large data sets to smaller data sets, called keys. For example, a single integer can serve as an index to an array, such as an associative array. The values returned by a hash function are called hash values, hash codes, hash sums, checksums or simply hashes. Hash functions are mostly used to accelerate table lookup or data comparison tasks such as finding items in a database, detecting duplicated or similar records in a large file, finding similar stretches in DNA sequences, and so on. A hash function should be referentially transparent, that is, if called twice on input that is "equal" (e.g., strings that consist of the same sequence of characters), it should give the same result. This is a contract in many programming languages that allows a user to override equality and hash functions for an object, that if two objects are equal their hash codes must be the same. This is important in order for it to be possible to find an element in a hash table quickly since two of the same element would both hash to the same slot. Although some embodiments use a hash function, it may be appreciated that related functions may be substituted for a has function, such as checksums, check digits, fingerprints, randomization functions, error correcting codes, and cryptographic hash functions, among others. The embodiments are not limited in this context.

Once page hash values 308-h are calculated, the page hash component 204-1 may output the page hash values 308-h to a page compare component 204-2 executing on the processor circuit 132.

In addition to the page hash component 204-1, the processor circuit 132 may execute another memory management component 204-e, such as a page compare component 204-2. Once the page hash component 204-1 generates page hash values 308-h, the page compare component 204-2 may compare the page hash values 308-h to identify matching page hash values representing identical memory pages among the candidate memory pages 306-g. For example, the page compare component 204-2 may compare the page hash values 308-*h* as an initial check for similarity. When the page hash values 308-*h* are identical, the page compare component 204-2 may compare the actual candidate memory pages 306-*g* to formally determine whether the candidate memory pages 306-*g* are identical, and output identical memory pages 310-*i*. Continuing with our previous example, assume the page compare component 204-2 compares page hash values 308-1, 308-2 and 308-3, and determines that page hash values 308-1, 308-2 are identical. The page compare component 204-2 may then compare the candidate memory pages 306-1, 306-2 to formally determine whether the candidate memory pages 306-1, 306-2 are in fact identical.

The page compare component 204-2 may utilize any number of comparison algorithms to determine identical candidate memory pages 306-*g* and/or page hash values 308-*h*. In one embodiment, for example, the page compare component 204-2 may use a comparison algorithm similar to one used by a Linux® Kernel Shared Memory (KSM) designed for use with a Kernel-based Virtual Machine (KVM). KSM allows a hypervisor to increase a number of concurrent KVM by consolidating identical memory pages. In KSM, memory pages are managed by two red-black trees, one of which is ephemeral. The first tree, called the unstable tree, is used to store new memory pages that are not yet understood to be stable. In other words, memory pages that are candidates for merging (e.g., unchanged for some period of time) are stored in the unstable tree. Memory pages in the unstable tree are not write protected. The second tree, called the stable tree, stores those memory pages that have been found to be stable and merged by KSM. To identify whether a page is volatile or non-volatile, KSM uses a 32-bit checksum. When a page is scanned, its checksum is calculated and stored with the page. On a subsequent scan, if a newly computed checksum is different from the previously generated checksum, the page is changing and is therefore not a good candidate for merging. Although KSM is shown as one possible implementation for the page compare component 204-1, it may be appreciated that other comparison algorithms may be used as desired for a given implementation. The embodiments are not limited in this context.

Once the page compare component 204-2 identifies a set of identical memory pages 310-*i* from among the candidate memory pages 306-*g*, the page compare component 204-2 may output the identical memory pages 310-*i* (or references) to the processor circuit 130. This may be accomplished, for example, using a LLC memory cache, such as a L3 memory cache, shared between the processor circuits 130, 132. Alternatively, this may be accomplished using a system interconnect, such as a PCIe bus, connecting the processor circuits 130, 132.

In addition to the page nomination component 202-1, the processor circuit 130 may execute other memory management components 202-*d*, such as a page sort component 202-2 and/or a page merge component 202-3. In this particular implementation, the page sort component 202-2 is not used, and is either omitted or rendered inactive on the processor circuit 130 as indicated by the dashed border. However, the page sort component 202-2 may be used in an embodiment described with reference to FIG. 4.

The page merge component 202-3 is generally arranged to merge identical memory pages 310-*i* into a shared memory page 154-*c*. As with the scanning operations performed by the page nomination component 202-1, merge operations are generally sequential in nature, and therefore suitable for execution by the processor circuit 130. By way of example, assume the page compare component 204-2 executing on the processor circuit 132 identifies the identical memory pages 310-1, 310-2 corresponding to the candidate memory pages 306-1, 306-2. The page merge component 202-3 may merge the identical memory pages 310-1, 310-2 into a shared memory page 154-1, and store the shared memory page 154-1 in the shared memory segment 304-1. This releases the private memory segments 302-1, 302-2 for use by other virtual machines 160-*a*.

The virtual machines 160-1, 160-2 that stored the original private memory pages 152-1, 152-2 that were subsequently merged into the shared memory page 154-1 may be given access to the shared memory page 154-1. In the event either of the virtual machines 160-1, 160-2 changes or modifies the shared memory page 154-1, the shared memory page 154-1 may be converted back into private memory pages 152-1, 152-2 stored in the private memory segments 302-1, 302-2, respectively. This releases the shared memory segment 304-1 for use by other virtual machines 160-*a*.

Once the memory management application 140 performs a set of memory de-duplication operations to form the shared memory page 154-1, the memory management application 140 may use a feed-back loop to update selection criteria used by the page nomination component 202-1. The memory management application 140 may analyze matches of identical memory pages 310-*i*, such as the identical memory pages 310-1, 310-2, to make more accurate assumptions used to nominate candidate memory pages 306-*g*. For example, the page nomination component 202-1 may utilize a first selection criterion that assumes an OS stores a system file at an identical memory address within each private memory segment 302-1, 302-2 and 302-3. Upon a match of identical memory pages 310-1, 310-2 which correspond to private memory pages 152-1, 152-2, respectively, stored in the private memory segments 302-1, 302-2, the page nomination component 202-1 may modify the first selection criterion so that it applies only to the private memory segments 302-1, 302-2, but not the private memory segment 302-3. If the page compare component 204-2 had not found any identical memory pages 310-*i* from among the candidate memory pages 306-*g*, the page nomination component 202-1 may modify the first selection criterion to use a completely different memory address for the private memory pages 152-*b*. This feed-back loop refines the selection criteria used by the page nomination component 202-1 to more accurately nominate a quality set of candidate memory pages 306-*g*, that is a set of candidate memory pages 306-*g* with a higher likelihood of duplicative content.

Figure 4:
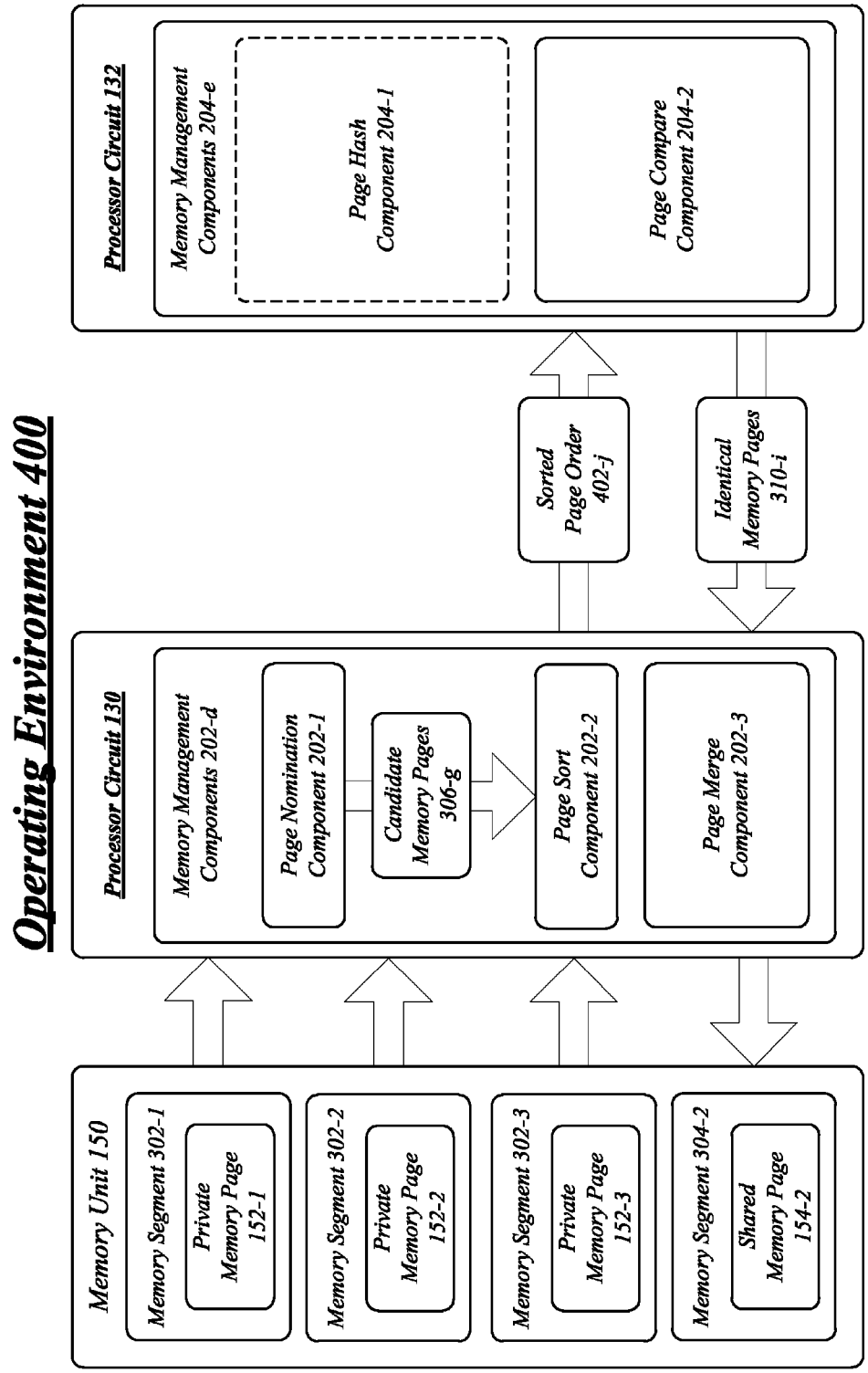
FIG. 4 illustrates an embodiment of a second operating environment for a memory management apparatus of a virtual machine.

FIG. 4 illustrates an embodiment of an operating environment 400 for the memory management apparatus 100 and/or the memory management apparatus 200. The operating environment 400 illustrates an exemplary implementation of the memory management components 202-*d*, 204-*e* of the memory management application 140 as executed by the processor circuits 130, 132, respectively. More particularly, the operating environment 300 may illustrate a case where memory de-duplication operations utilize a sorting technique to identify and merge duplicative private memory pages 152-*b* into a shared memory page 154-*c*.

Similar to the operating environment 300, the operating environment 400 may include a memory unit 150 segmented into multiple private memory segments 302-*x* and shared memory segments 304-*y*. The operating environment 400 may also include a set of memory management components 202-*d* executing on the processor circuit 130, such as the page nomination component 202-1 and the page merge component 202-3, and a set of memory management component 204-*e* executing on the processor circuit 132, such as the page compare component 204-2. However, unlike the operating environment 300, the operating environment 400 may further include an activated page sort component 202-2, and an inactivated (or omitted) page hash component 204-1 as indicated by the dashed border.

As shown in FIG. 4, the page nomination component 202-1 may be operative on the processor circuit 130 to nominate a set of candidate memory pages 306-g suitable for a shared memory page 154-2 based on a set of selection criteria, as previously described with reference to FIG. 3. Rather than output the candidate memory pages 306-g to the processor circuit 132, the page nomination component 202-1 may output the candidate memory pages 306-g to the page sort component 202-2 executing on the same processor circuit 130.

The page sort component 202-2 may be operative on the processor circuit 130 to sort the candidate memory pages 306-g based on a page size for each candidate memory page 306-g. As with nominating operations performed by the page nomination component 202-1, sort operations performed by the page sort component 202-2 are sequential in nature. As such, the page sort component 202-2 may be better executed by the processor circuit 130 compared to the processor circuit 132.

As previously described, a memory page is generally a fixed-length contiguous block of virtual memory that is a smallest unit for memory allocation by an operating system for a program and transfer between main memory and an auxiliary store, such as a hard disk drive. Page size is usually determined by processor architecture. Traditionally, pages in a system had uniform size, for example 4096 bytes. However, modern processor designs often allow two or more, sometimes simultaneous, page sizes due to the benefits and penalties. There are several points that can factor into choosing a given page size, including factors such as page size versus page table size, page size versus translation lookaside buffer (TLB) usage, internal fragmentation of pages, page size versus disk access, and so forth.

In one embodiment, the term "page size" for a private memory page 152-b may refer to a system page size as allocated by the processor 130 to a virtual machine 160-a, such as 4 kilobytes (kB), for example. In this case, the virtualization application 138 may assign each virtual machine 160-a different system page sizes based on a predicted workload or use of the virtual machine 160-a. Those virtual machines 160-a using the same system page sizes may be utilizing similar operating systems or application programs, which are in turn good indicators of duplicative content. In one embodiment, the term "page size" for a private memory page 152-b may refer to a portion of a system page size, such as a total amount of data stored in a private memory page 152-b. For instance, a private memory page 152-b may have a system page size of 4 kB and only store 2 kB worth of data, leaving 2 kB of unused space.

In either case, each private memory page 152-b nominated as a candidate memory page 306-g should include a page size stored with the private memory page 152-b. In those cases where a private memory page 152-b does not have a stored page size, the page sort component 202-2 may calculate a page size for the private memory page 152-b.

The page sort component 202-2 may sort the candidate memory pages 306-g into a sorted page order 402-j. The sorted page order 402-j may comprise, for example, a sequential order, such as a highest page size to a lowest page size, or vice-versa. The page sort component 202-2 may output the sorted page order 402-j to the processor circuit 132. The sorted page order 402-j may include a sorted list of references to the candidate memory pages 306-g, such as a sorted list of memory page identifiers and associated page sizes. This may be accomplished, for example, using a LLC memory cache, such as a L3 memory cache, shared between the processor circuits 130, 132. Alternatively, this may be accomplished using a system interconnect, such as a PCIe bus, connecting the processor circuits 130, 132.

The page compare component 204-2 may receive the sorted page order 402-j, and compare page sizes of adjacent candidate memory pages 306-g to identify matching page sizes representing identical memory pages 310-i. For example, the page compare component 204-2 may compare the page sizes as an initial check for similarity. When the page sizes are identical, the page compare component 204-2 may compare the actual candidate memory pages 306-g to formally determine whether the candidate memory pages 306-g are identical, and output identical memory pages 310-i.

Once the page compare component 204-2 identifies a set of identical memory pages 310-i from among the candidate memory pages 306-g, the page compare component 204-2 may output the identical memory pages 310-i (or references) to the processor circuit 130. This may be accomplished, for example, using a LLC memory cache, such as a L3 memory cache, shared between the processor circuits 130, 132. Alternatively, this may be accomplished using a system interconnect, such as a PCIe bus, connecting the processor circuits 130, 132.

The page merge component 202-3 may receive references for the identical memory pages 310-i, and merge the identical memory pages 310-i into a shared memory page 154-2, as previously described with reference to FIG. 3. The page merge component 202-3 may then store the shared memory page 154-2 in a shared memory segment 304-2 of the memory unit 150.

Once the memory management application 140 performs a set of memory de-duplication operations to form the shared memory page 154-2, the memory management application 140 may use a feed-back loop to update selection criteria used by the page nomination component 202-1 as described with reference to the operating environment 400 of FIG. 4.

Figure 5:
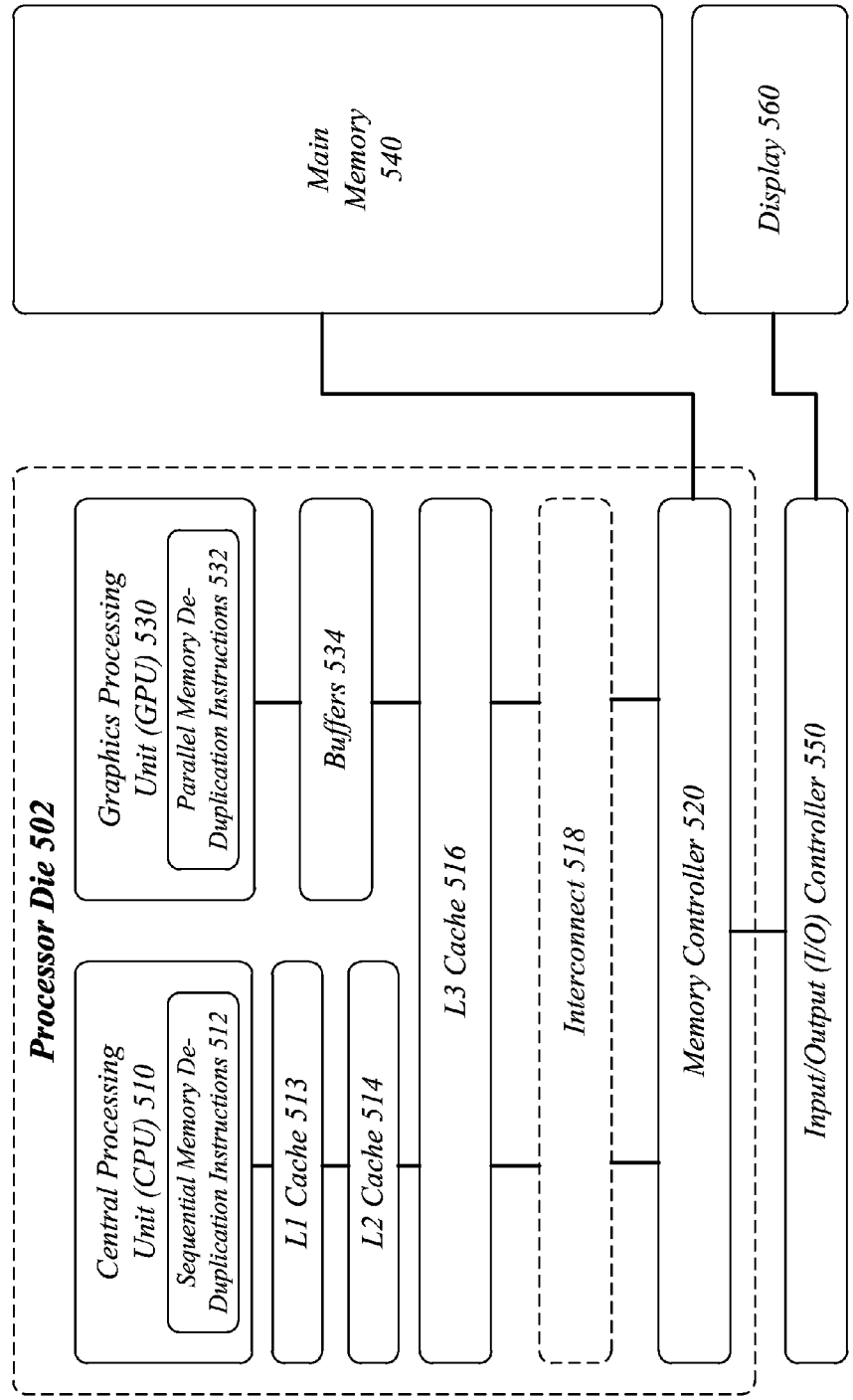
FIG. 5 illustrates an embodiment of a third memory management apparatus of a virtual machine.

FIG. 5 illustrates a block diagram for a memory management apparatus 500. The memory management apparatus 500 may be an exemplary implementation of the memory management apparatus 100 and/or 200. Although the memory management apparatus 500 shown in FIG. 5 has a limited number of elements in a certain topology, it may be appreciated that the memory management apparatus 500 may include more or less elements in alternate topologies as desired for a given implementation.

In the illustrated embodiment shown in FIG. 5, the memory management apparatus 500 may comprise a processor die 502, which is a small block of semiconducting material (e.g., a wafer of electronic-grade silicon) on which an integrated circuit (IC) for processing is fabricated. The processor die 502 may include a CPU 510 and a GPU 530, each of which are representative implementations of the processor circuits 130, 132, respectively.

The CPU 510 may be arranged to execute a set of sequential memory de-duplication instructions 512. The CPU 510 may perform a set of sequential memory de-duplication operations in accordance with the sequential memory de-duplication instructions 512 to convert multiple private memory pages 152-b for multiple virtual machines 160-a into a shared memory page 154-c for the multiple virtual machines 160-a. Examples for the sequential memory de-duplication instructions 512 may include without limitation the memory management components 202-d of the memory management application 140, such as the page nomination component 202-1, the page sort component 202-2, and/or the page merge component 202-3. The embodiments are not limited to these examples.

The GPU 530 may be arranged to execute a set of parallel memory de-duplication instructions 532. The GPU 530 may perform a set of parallel memory de-duplication operations in accordance with the parallel memory de-duplication instructions 532 to convert the multiple private memory pages 152-*b* for the multiple virtual machines 160-*a* into the shared memory page 154-*c* for the virtual machines 160-*a*. Examples for the parallel memory de-duplication instructions 532 may include without limitation the memory management components 204-*e* of the memory management application 140, such as the page hash component 204-1 and/or the page compare component 204-2. The embodiments are not limited to these examples.

The processor die 502 may implement a multi-level cache structure for the CPU 510 and/or the GPU 530. A cache may be used by the CPU 510 of a computer to reduce an average memory access time. A cache is a smaller, faster memory which stores copies of the data from the most frequently used main memory locations of a main memory 540. As long as most memory accesses are cached memory locations, the average latency of memory accesses will be closer to the cache latency than to the latency of main memory 540. When the CPU 510 needs to read from or write to a location in the main memory 540, it first checks whether a copy of that data is in a cache. If so, the CPU 510 immediately reads from or writes to the cache, which is much faster than reading from or writing to the main memory 540. If a copy of the data is not in a cache, the CPU 510 may read or write data to the main memory 540 via the memory controller 520.

The CPU 510 may include multiple independent caches, including an instruction cache to speed up executable instruction fetch, a data cache to speed up data fetch and store, and a translation lookaside buffer (TLB) used to speed up virtual-to-physical address translation for both executable instructions and data. Memory caches are usually organized as a hierarchy of one or more cache levels, such as a L1 cache, a L2 cache, a L3 cache, and so forth. This cache structure is sometimes referred to as a multi-level cache. In a multi-level cache, the CPU 510 generally operates by checking the smallest cache first (e.g., a L1 cache), and if this produces a hit, the CPU 510 proceeds at high speed. If the smaller cache produces a miss, the CPU 510 proceeds to check the next larger cache (e.g., a L2 cache). This process continues until the last level cache (LLC) is reached, such as a L3 cache, and in the event of a miss in the LLC, the CPU 510 retrieves the data from main memory 540.

As shown in FIG. 5, the processor die 502 may include a L1 cache 513 and a L2 cache 514, both accessible by the CPU 510. The processor die 502 may further include a L3 cache 516 accessible by both the CPU 510 and the GPU 530. As a result of the shared L3 cache 516, the CPU 510 and the GPU 530 may communicate data efficiently between each other, allowing the memory management application 140 to allocate heterogeneous workloads to the heterogeneous processors of CPU 510 and GPU 530 in an efficient and low cost manner.

The processor die 502 may further include one or more buffers 534 coupled to the GPU 530. In one embodiment, the buffers 534 may comprise frame buffers. The GPU 530 may use the buffers 534 to rapidly manipulate and alter memory to accelerate building of images in the buffers 534 intended for output to a display 560.

The processor die 502 may optionally include an interconnect 518 coupled to the L3 cache 516 and accessible by the CPU 510 and the GPU 530. The interconnect 518 may comprise a bus or crossbar switch to communicate data between the CPU 510 and the GPU 530, or to other circuit elements on or off the processor die 502. The interconnect 518 may be optionally due to the presence of the L3 cache 516 to communicate data between the CPU 510 and the GPU 530.

The processor die 502 may include a memory controller 520 coupled to the interconnect 518 and accessible by the CPU 510 and the GPU 530. The memory controller 502 is a digital circuit which manages a flow of data going to and from the main memory 540. Although shown as integrated on the processor die 502, the memory controller 502 may be on a separate chip or integrated into another chip, such as a chipset for the processor die 502. For instance, the memory controller 502 may be integrated on a microchip in a family of microchips of an Intel Platform Controller Hub (PCH) chipset to support the CPU 510 and/or the GPU 530.

The processor 502 may include an input/output (I/O) controller 550 coupled to the memory controller 520 and the display 560. The I/O controller 550 may connect and control peripheral devices, such as the display 560. As with the memory controller 520, the I/O controller 550 may be integrated on a microchip in a family of microchips of an Intel PCH chipset to support the CPU 510 and/or the GPU 530. Although shown as separate from the processor die 502, the I/O controller 550 may be integrated on the processor die 502.

The display 560 may be coupled to the CPU 510 and the GPU 530 via the I/O controller 550. The display 560 may present information stored in the main memory 540, the buffers 534, and/or the memory unit 150. The display 560 may comprise any digital display device suitable for the electronic device 120. For instance, the display 560 may be implemented by a liquid crystal display (LCD) such as a touch-sensitive, color, thin-film transistor (TFT) LCD, a plasma display, organic light emitting diode (OLED) displays, a cathode ray tube (CRT) display, or other type of suitable visual interface for displaying content to a user of the electronic device 120. The display 560 may include some form of a backlight or brightness emitter as desired for a given implementation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein, such as the memory management apparatus 100, 200 or 500.

In the illustrated embodiment shown in FIG. 6, the logic flow 600 may retrieve the set of private memory pages, each private memory page stored in a corresponding private memory segment accessible by a single virtual machine at block 602. For example, the processor 130 (or CPU 510) may execute memory de-duplication instructions of the memory management application 140 to retrieve a set of private memory pages 152-1, 152-2 and 152-3 from the memory unit 150, each private memory page 152-1, 152-2 and 152-3 stored in a corresponding private memory segment 302-1, 302-2 and 302-3, respectively, and accessible by a single virtual machine 160-1, 160-2 and 160-3, respectively. In other words, the virtual machine 160-1 can only access the private memory page 152-1, the virtual machine 160-2 can only access the private memory page 152-2, and the virtual machine 160-3 can only access the private memory page 152-3.

The logic flow 600 may execute, by a first processor circuit, a set of sequential memory de-duplication instructions to convert a set of private memory pages into a shared memory page for multiple virtual machines at block 604. For example, the processor circuit 130 (or CPU 510) may execute a set of sequential memory de-duplication instructions 512 for the memory management application 140 to convert the set of private memory pages 152-1, 152-2 and 152-3 into a shared memory page 154-1 for multiple virtual machines 160-1, 160-2 and 160-3.

The logic flow 600 may execute, by a second processor circuit, a set of parallel memory de-duplication instructions to convert the set of private memory pages into the shared memory page for the multiple virtual machines at block 606. For example, the processor circuit 132 (or GPU 530) may execute a set of parallel memory de-duplication instructions 532 for the memory management application 140 to convert the set of private memory pages 152-1, 152-2 and 153-3 into the shared memory page 154-1 for the multiple virtual machines 160-1, 160-2 and 160-3.

The logic flow 600 may store the shared memory page in a shared memory segment accessible by the multiple virtual machines at block 608. For example, the processor 130 (or CPU 510) may execute memory de-duplication instructions of the memory management application 140 to store the shared memory page 154-1 in a shared memory segment 304-1 accessible by the multiple virtual machines 160-1, 160-2 and 160-3.

FIG. 7 illustrates one embodiment of a logic flow 700. The logic flow 700 may be representative of some or all of the operations executed by one or more embodiments described herein, such as the memory management apparatus 100, 200 or 500. More particularly, the logic flow 700 illustrates exemplary operations to perform hash-based memory de-duplication operations.

In the illustrated embodiment shown in FIG. 7, the logic flow 700 may nominate, by the first processor circuit, a set of candidate memory pages suitable for the shared memory page based on a set of selection criteria at block 702. For example, the processor circuit 130 (or CPU 510) may execute a set of sequential memory de-duplication instructions 512 for the page nomination component 202-1 of the memory management application 140 to nominate a set of candidate memory pages 306-1, 306-2, 306-3 and 306-4 corresponding to the private memory pages 152-1, 152-2, 152-3 and 152-4, respectively, suitable for the shared memory page 154-1 based on a set of selection criteria. Examples of selection criteria may comprise assumptions used to search for duplicative content, such as a memory address used by an OS for system files, a memory address used by an application program for application files, a particular page size for a private memory page 152-$b$, a particular file name for a private memory page 152-$b$, a particular hash value 308-$h$, a particular set of private memory segments 304-$x$ with a high-level of duplicative content, a particular set of private memory segments 304-$x$ with a high-level of duplicative content at a given time (e.g., such as auto-updates to an OS at the same time every day), and so forth. The selection criteria may be refined based on previous match results to improve subsequent nomination operations.

The logic flow 700 may generate, by the second processor circuit, one or more page hash values for one or more candidate memory pages within the set of candidate memory pages at block 704. For example, the processor circuit 132 (or GPU 530) may execute a set of parallel memory de-duplication instructions 532 for the page hash component 204-1 of the memory management application 140 to generate page hash values 308-1, 308-2, 308-3 and 308-4 for the set of candidate memory pages 306-1, 306-2, 306-3 and 306-4, respectively, within the set of candidate memory pages 306-$g$. The massively parallel processor architecture of the processor circuit 132 (or GPU 530) will generate the page hash values 308-1, 308-2, 308-3 and 308-4 faster than the sequential processor architecture of the processor circuit 130 (or CPU 510).

The logic flow 700 may compare, by the second processor circuit, the page hash values to identify matching page hash values representing identical memory pages at block 706. For example, the processor circuit 132 (or GPU 530) may execute a set of parallel memory de-duplication instructions 532 for the page compare component 204-2 of the memory management application 140 to compare page hash values 308-1, 308-2, 308-3 and 308-4 for the set of candidate memory pages 306-1, 306-2, 306-3 and 306-4, respectively, to identify matching page hash values 308-1, 308-2 and 308-3. This indicates a possible set of matching pages. The page compare component 204-2 may compare the actual candidate memory pages 306-1, 306-2 and 306-3 to confirm the possible matches, and output a set of identical memory pages 310-1, 310-2, and 310-3 corresponding to the candidate memory pages 306-1, 306-2 and 306-3.

The logic flow 700 may merge, by the first processor circuit, the identical memory pages into the shared memory page at block 708. For example, the processor circuit 130 (or CPU 510) may execute a set of sequential memory de-duplication instructions 512 for the page merge component 202-3 of the memory management application 140 to merge the identical memory pages 310-1, 310-2 and 310-3 corresponding to the candidate memory pages 306-1, 306-2, and 306-3, respectively, which in turn corresponds to the private memory pages 152-1, 152-2, and 152-3. The page merge component 202-3 may merge the private memory pages 152-1, 152-2 and 152-3 into the shared memory page 154-1.

FIG. 8 illustrates one embodiment of a logic flow 800. The logic flow 800 may be representative of some or all of the operations executed by one or more embodiments described herein, such as the memory management apparatus 100, 200 or 500. More particularly, the logic flow 800 illustrates exemplary operations to perform page size-based memory de-duplication operations.

In the illustrated embodiment shown in FIG. 8, the logic flow 800 may nominate, by the first processor circuit, a set of candidate memory pages suitable for the shared memory page based on a set of selection criteria at block 802. For example, the processor circuit 130 (or CPU 510) may execute a set of sequential memory de-duplication instructions 512 for the page nomination component 202-1 of the memory management application 140 to nominate a set of candidate memory pages 306-1, 306-2, 306-3 and 306-4 corresponding to the private memory pages 152-1, 152-2, 152-3 and 152-4, respectively, suitable for a shared memory page 154-2 based on a set of selection criteria. The selection criteria may be refined based on previous match results to improve subsequent nomination operations.

The logic flow 800 may sort, by the first processor circuit, the candidate memory pages based on a page size for each candidate memory page at block 804. For example, the processor circuit 130 (or CPU 510) may execute a set of sequential memory de-duplication instructions 512 for the page sort component 202-2 of the memory management application 140 to sort the set of candidate memory pages 306-1, 306-2, 306-3 and 306-4, based on page sizes stored with the candidate memory pages 306-1, 306-2, 306-3 and 306-4. If page sizes are not stored with the candidate memory pages 306-1, 306-2, 306-3 and 306-4, the page sort component 202-2 or some other component of the memory management application 140 may generate the page sizes. The highly sequential processor architecture of the processor circuit 130 (or CPU 510) will sort the page sizes faster than the parallel processor architecture of the processor circuit 132 (or GPU 530). The page sort component 202-2 may then output a sorted page order 402-$j$ comprising a sorted list of references or identifiers for the candidate memory pages 306-1, 306-2, 306-3 and 306-4.

The logic flow 800 may compare, by the second processor circuit, the page sizes of adjacent candidate memory pages to identify matching page sizes representing identical memory pages at block 806. For example, the processor circuit 132 (or GPU 530) may execute a set of parallel memory de-duplication instructions 532 for the page compare component 204-2 of the memory management application 140 to compare page sizes for adjacent candidate memory pages 306-1, 306-2, 306-3 and 306-4 to identify matching page sizes. Assume the candidate memory pages 306-1, 306-2 are adjacent to each other in the sorted page order 402-$j$, and each have a page size of 4 kB. Further assume the candidate memory pages 306-1, 306-2 are adjacent to each other in the sorted page order 402-$j$, also each having a page size of 4 kB. The matching page sizes may indicate potential duplicative content. The page compare component 204-2 may compare the actual candidate memory pages 306-1, 306-2, and 306-3 to confirm the possible matches, and output a set of identical memory pages 310-1, 310-2, and 310-3 corresponding to the candidate memory pages 306-1, 306-2 and 306-3.

The logic flow 800 may merge, by the first processor circuit, the identical memory pages into the shared memory page at block 808. For example, the processor circuit 130 (or CPU 510) may execute a set of sequential memory de-duplication instructions 512 for the page merge component 202-3 of the memory management application 140 to merge the identical memory pages 310-1, 310-2 and 310-3 corresponding to the candidate memory pages 306-1, 306-2, and 306-3, respectively, which in turn corresponds to the private memory pages 152-1, 152-2, and 152-3. The page merge component 202-3 may merge the private memory pages 152-1, 152-2 and 152-3 into the shared memory page 154-2.

Figure 9:
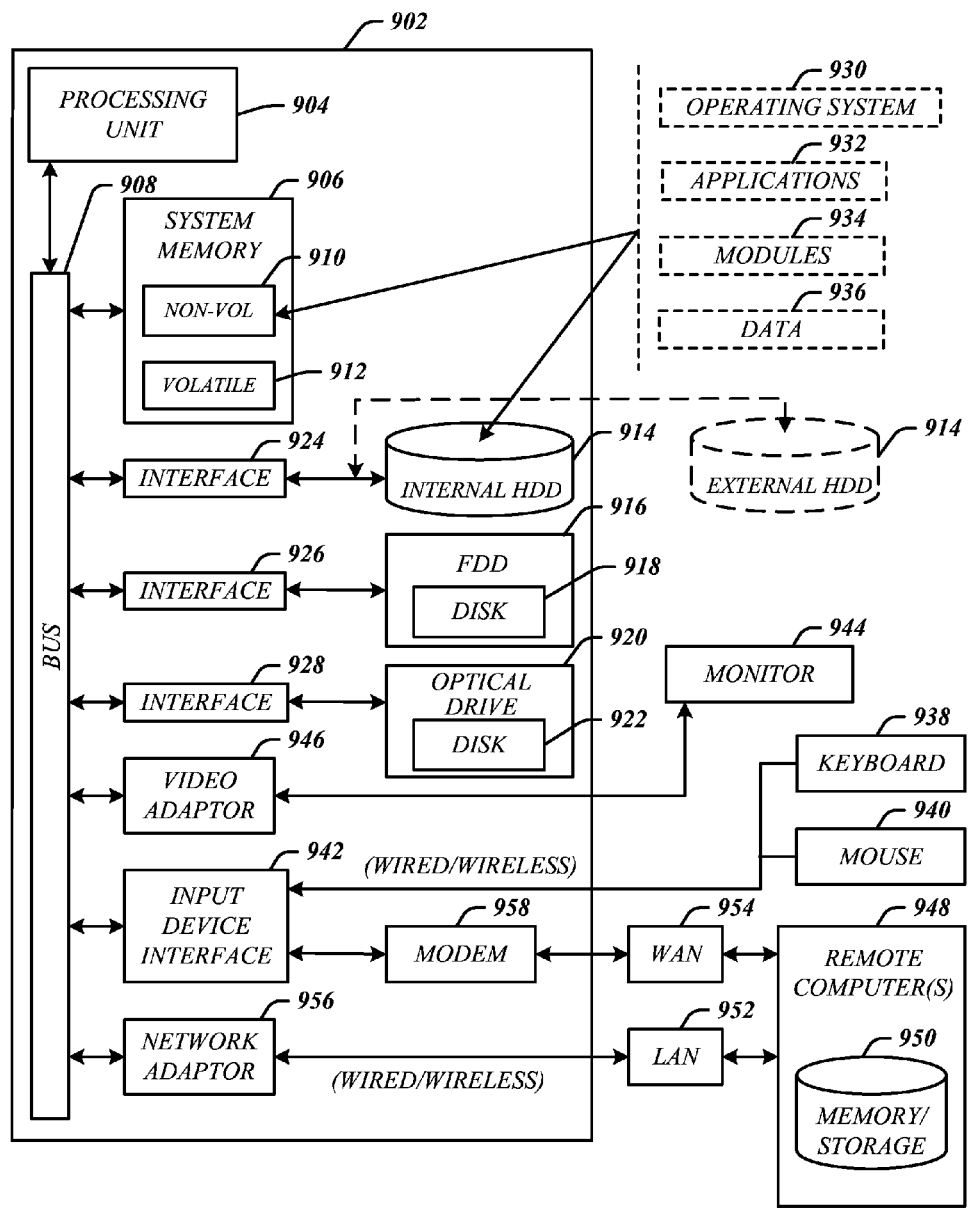
FIG. 9 illustrates an embodiment of a computing architecture suitable for virtualization into multiple virtual machines.

FIG. 9 illustrates an embodiment of an exemplary computing architecture 900 suitable for implementing various embodiments as previously described, such as the memory management apparatus 100, 200 and 500. In one embodiment, the computing architecture 900 may comprise or be implemented as part of an electronic device, such as the electronic device 120, among others. The embodiments are not limited in this context.

As used in this application, the terms "apparatus" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises multiple processing units 904, a system memory 906 and a system bus 908. The processing units 904 may comprise, for example, the processor circuits 130, 132, the CPU 510, and/or the GPU 530.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the memory management apparatus 100, 200 and 500.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Elements of the various embodiments may be implemented as various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a first processor circuit;
a second processor circuit coupled to the first processor circuit;
a memory unit coupled to the first processor circuit and the second processor circuit, the memory unit to store private memory pages and shared memory pages for multiple virtual machines;
a memory management application operative on the first processor circuit and the second processor circuit to perform memory de-duplication operations on the private memory pages stored in the memory unit to form shared memory pages, the memory management application to perform sequential memory de-duplication operations on the first processor circuit and parallel memory de-duplication operations on the second processor circuit, the first processor circuit capable of executing a sequential operation more quickly than the second processor circuit, and the second processor circuit capable of executing a parallel operation more quickly than the first processor circuit;
a page nomination component operative on the first processor circuit to nominate a set of candidate memory pages suitable for a shared memory page based on a set of selection criteria as at least one of the sequential memory de-duplication operations;
a page compare component operative on the second processor circuit to compare a characteristic of at least two of the candidate memory pages to identify identical memory pages as at least one of the parallel memory de-duplication operations; and
a last level cache coupled to the first processor circuit and the second processor circuit, the page nomination component to provide indications of the candidate memory pages to the second processor circuit via the last level cache, and the page compare component to provide indications of the identical memory pages to the first processor circuit via the last level cache.

2. The apparatus of claim 1, the memory management application comprising:
a page hash component operative on the second processor circuit to generate one or more page hash values for one or more candidate memory pages within the set of candidate memory pages, the page compare component operative on the second processor circuit to compare the page hash values to identify matching page hash values representing identical memory pages; and
a page merge component operative on the first processor circuit to merge the identical memory pages into the shared memory page.

3. The apparatus of claim 1, the memory management application comprising:
a page sort component operative on the first processor circuit to sort the candidate memory pages based on a page size for each candidate memory page, the page compare component operative on the second processor circuit to compare the page sizes of adjacent candidate memory pages to identify matching page sizes representing identical memory pages; and
a page merge component operative on the first processor circuit to merge the identical memory pages into the shared memory page.

4. The apparatus of claim 1, the first processor circuit comprising a central processing unit (CPU) of a computing platform, the second processor circuit comprising a graphics processing unit (GPU) of the computing platform, the first processor circuit better suited to perform a sequential memory de-duplication operation than the second processor circuit, and the second processor circuit better suited to perform a parallel memory de-duplication operation than the first processor circuit.

5. The apparatus of claim 1, comprising a level three cache coupled to the first processor circuit and the second processor circuit, the page nomination component to provide indications of the candidate memory pages to the second processor circuit via the level three cache, and the compare component to provide indications of the identical memory pages to the first processor circuit via the level three cache.

6. The apparatus of claim 1, comprising a virtualization application operative on the first processor circuit to manage the multiple virtual machines.

7. The apparatus of claim 1, comprising a digital display coupled to the first processor circuit and the second processor circuit, the digital display operative to present information stored in the memory unit.

8. A computer-implemented method, comprising:

executing, by a first processor circuit, a set of sequential memory de-duplication instructions to convert a set of private memory pages into a shared memory page for multiple virtual machines;

executing, by a second processor circuit, a set of parallel memory de-duplication instructions to convert the set of private memory pages into the shared memory page for the multiple virtual machines, the first processor circuit capable of executing a sequential operation more quickly than the second processor circuit, and the second processor circuit capable of executing a parallel operation more quickly than the first processor circuit;

nominating, by the first processor circuit executing the set of sequential memory de-duplication instructions, a set of candidate memory pages suitable for the shared memory page based on a set of selection criteria;

providing, by the first processor circuit executing the set of sequential memory de-duplication instructions, indications of the set of candidate memory pages to the second processor circuit via a last level cache coupled to the first and second processor circuits;

comparing, by the second processor circuit executing the set of parallel memory de-duplication instructions, a characteristic of at least two of the candidate memory pages to identify identical memory pages; and providing, by the second processor circuit executing the set of parallel memory de-duplication instructions, indications of the identical memory pages to the first processor circuit via the last level cache.

9. The computer-implemented method of claim 8, comprising retrieving the set of private memory pages, each private memory page stored in a corresponding private memory segment accessible by a single virtual machine.

10. The computer-implemented method of claim 8, comprising storing the shared memory page in a shared memory segment accessible by the multiple virtual machines.

11. The computer-implemented method of claim 8, comprising:
generating, by the second processor circuit, one or more page hash values for one or more candidate memory pages within the set of candidate memory pages;
comparing, by the second processor circuit, the page hash values to identify matching page hash values representing identical memory pages; and
merging, by the first processor circuit, the identical memory pages into the shared memory page.

12. The computer-implemented method of claim 8, comprising
sorting, by the first processor circuit, the candidate memory pages based on a page size for each candidate memory page;
comparing, by the second processor circuit, the page sizes of adjacent candidate memory pages to identify matching page sizes representing identical memory pages; and
merging, by the first processor circuit, the identical memory pages into the shared memory page.

13. The computer-implemented method of claim 8, comprising communicating information between the first processor circuit and the second processor circuit using a shared level three cache.

14. At least one non-transitory computer-readable storage medium comprising instructions that, when executed, cause a system to:
perform, by a first processor circuit, a set of sequential memory de-duplication operations to convert multiple private memory pages for multiple virtual machines into a shared memory page for the multiple virtual machines;

perform, by a second processor circuit, a set of parallel memory de-duplication operations to convert the multiple private memory pages for the multiple virtual machines into the shared memory page for the virtual machines, the first processor circuit having a sequential processing architecture, and the second processor circuit having a parallel processing architecture;

nominate, by the first processor circuit performing the set of sequential memory de-duplication operations, a set of candidate memory pages suitable for the shared memory page based on a set of selection criteria;

provide, by the first processor circuit performing the set of sequential memory de-duplication operations, indications of the set of candidate memory pages to the second processor circuit via a last level cache coupled to the first and second processor circuits;

compare, by the second processor circuit performing the set of parallel memory de-duplication operations, a characteristic of at least two of the candidate memory pages to identify identical memory pages; and provide, by the second processor circuit performing the set of parallel memory de-duplication operations, indications of the identical memory pages to the first processor circuit via the last level cache.

15. The non-transitory computer-readable storage medium of claim 14, comprising instructions that when executed cause the system to:
retrieve the multiple private memory pages from corresponding private memory segments accessible by each of the virtual machines; and
store the shared memory page in a shared memory segment accessible by the multiple virtual machines.

16. The non-transitory computer-readable storage medium of claim 14, comprising instructions that when executed cause the system to:
generate, by the second processor circuit, one or more page hash values for one or more candidate memory pages within the set of candidate memory pages;
compare, by the second processor circuit, the page hash values to identify matching page hash values representing identical memory pages; and
merge, by the first processor circuit, the identical memory pages into the shared memory page.

17. The non-transitory computer-readable storage medium of claim 14, comprising instructions that when executed cause the system to:
sort, by the first processor circuit, the candidate memory pages based on a page size for each candidate memory page;
compare, by the second processor circuit, the page sizes of adjacent candidate memory pages to identify matching page sizes representing identical memory pages; and
merge, by the first processor circuit, the identical memory pages into the shared memory page.

18. The non-transitory computer-readable storage medium of claim 14, comprising instructions that when executed cause the system to communicate information between the first processor circuit and the second processor circuit using a shared level three cache.

19. The apparatus of claim 1, the set of selection criteria comprising at least one of a particular memory address used by an application program to access an application file within a private memory page, particular page size for a private memory page, or a particular file name of a file within a private memory page.

* * * * *